Figure 1:
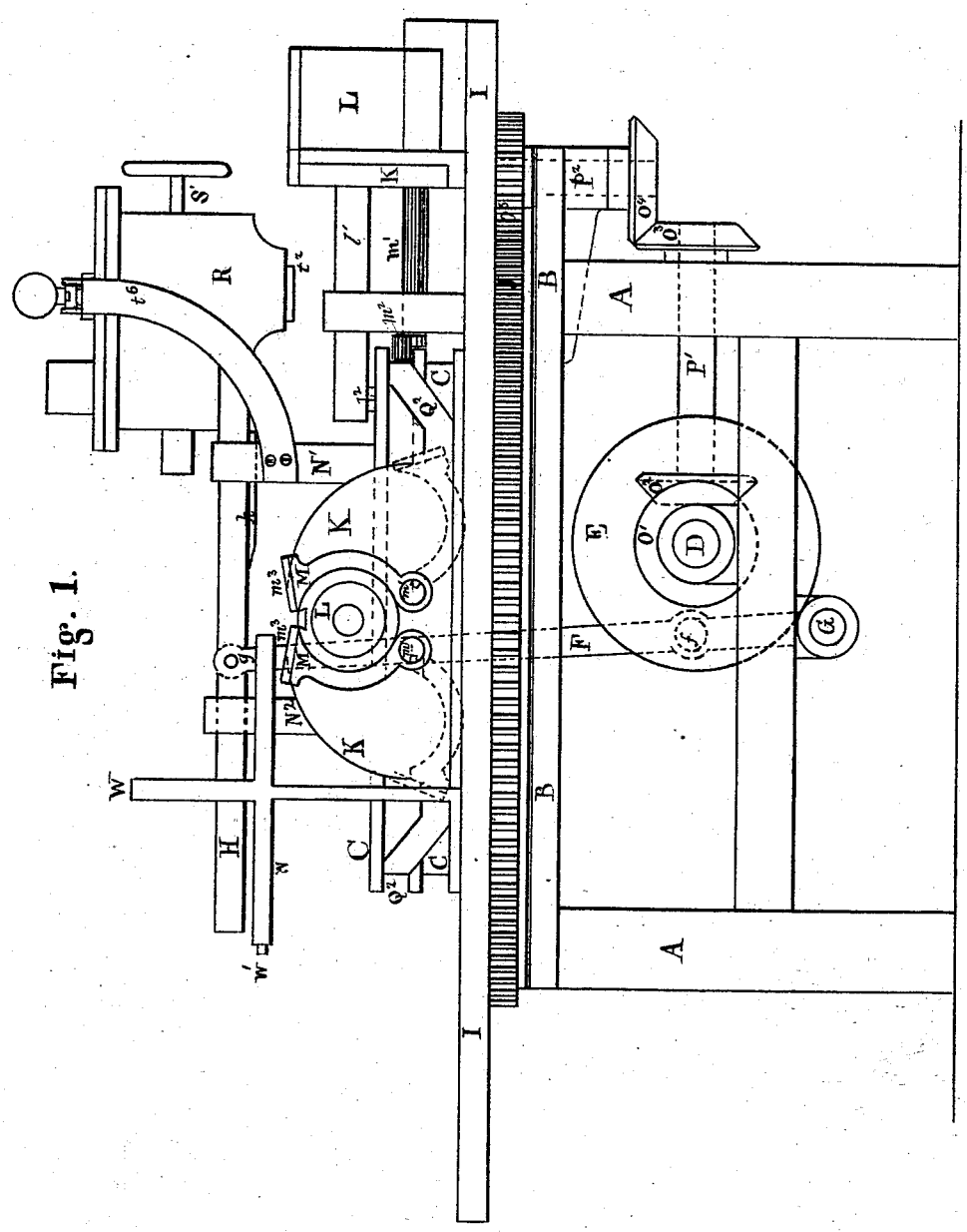

3 Sheets—Sheet 1.

P. DILLON & J. CLEARY.
Soldering-Machine.

No. 219,568. Patented Sept. 16, 1879.

Witnesses
John Lockie
W. E. Chaffee

Inventors
Peter Dillon
John Cleary
Per Wm. R. Singleton
Atty

3 Sheets—Sheet 2.
P. DILLON & J. CLEARY.
Soldering-Machine.
No. 219,568. Patented Sept. 16, 1879.
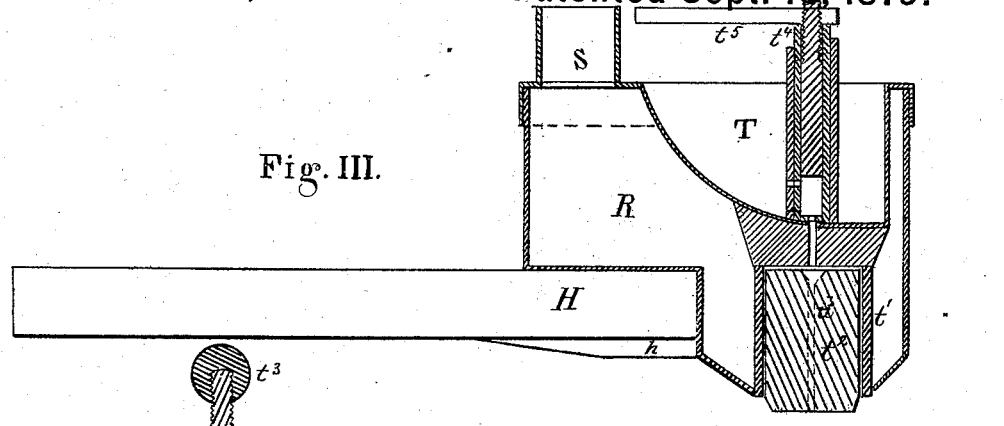
Fig. III.
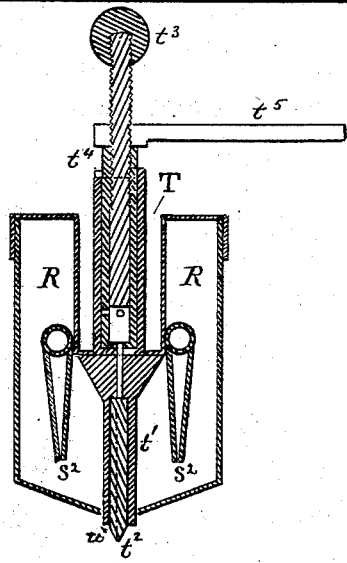
Fig. II.
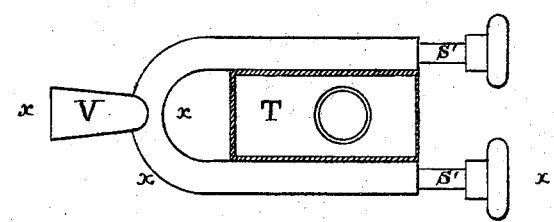
Fig. VII.
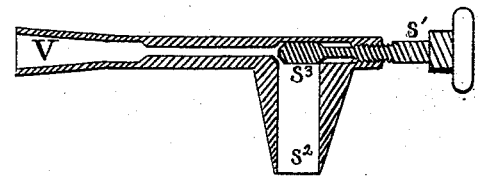
Witnesses
John Lockie
William A. Morse
Inventors
Peter Dillon
John Cleary
Per Wm. R. Singleton — Atty.

3 Sheets—Sheet 3.
P. DILLON & J. CLEARY.
Soldering-Machine.
No. 219,568. Patented Sept. 16, 1879.
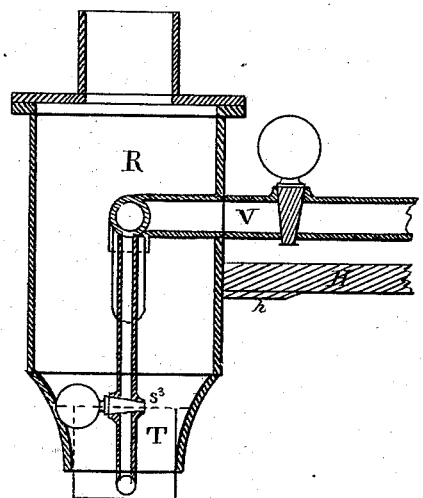
Fig. IV.
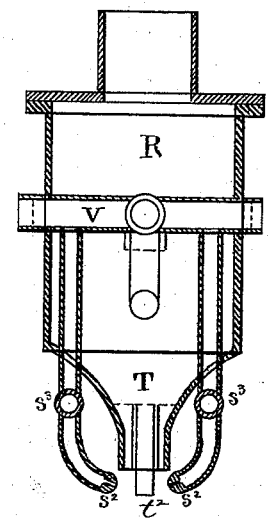
Fig. V.
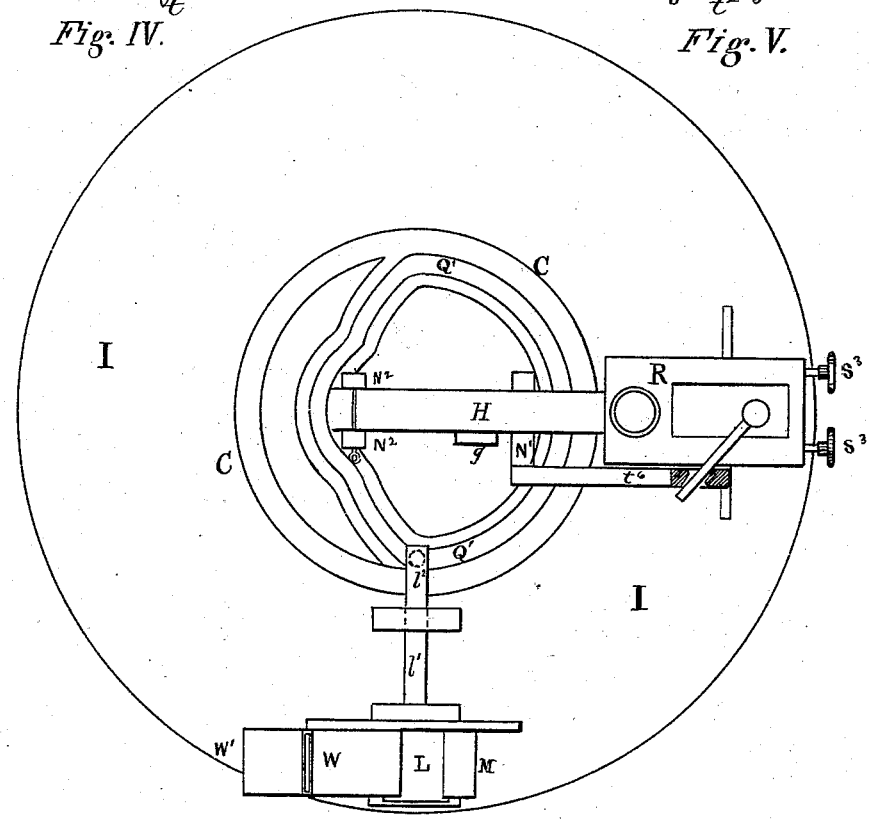
Fig. VI.
Witnesses
John Lockie
W. C. Chaffee
Inventors
Peter Dillon
John Cleary
Per Wm. R. Singleton
Atty

UNITED STATES PATENT OFFICE.

PETER DILLON AND JOHN CLEARY, OF SHERBROOKE, QUEBEC, CANADA.

IMPROVEMENT IN SOLDERING-MACHINES.

Specification forming part of Letters Patent No. 219,568, dated September 16, 1879; application filed June 11, 1879.

*To all whom it may concern:*

Be it known that we, PETER DILLON and JOHN CLEARY, of Sherbrooke, in the Province of Quebec and Dominion of Canada, have invented certain Improvements in Soldering-Machines, of which the following is a specification.

This invention relates to improvements in that class of soldering-machines in which solder is supplied to the soldering-tool intermittently, and the discharge regulated by a cock or other equivalent device.

It also relates to the construction of a machine for the generation of gas from gasoline or other equivalent base, for the purpose of reducing the metal by heat into solder.

It also relates to the construction and arrangement of parts, as hereinafter described and claimed.

Figure I is a side view of the cylinder-forming portion of the machine, with soldering apparatus attached in working position. Fig. II is a transverse vertical section of the soldering apparatus, consisting of gas-generator with solder-bath and soldering-bolt, on line $x\ x$ of Fig. III. Fig. III is a longitudinal vertical section of the soldering apparatus shown in Fig. II. Fig. IV is a vertical section, on line $y\ y$, Fig. V, of gas-generator without solder-bath, to be used with wire solder from box. Fig. V is a vertical section on $z\ z$ of Fig. IV of the same. Fig. VI is a plan view of Fig. I, showing the position of the cylinder-forming parts of the machine and the soldering apparatus. Fig. VII are details of Fig. II, showing the internal construction of the pipe V and branches and the valve for regulating the fluid.

The mechanism is attached to a frame, A, consisting of a firm stand with a top, B, on which is fitted and attached a raised circular center-piece, C. Through the under portion of the frame A runs the main shaft D, on which is the driving-wheel E, with a groove cut in the back to give a cam motion to the lever F, which connects with the driving-wheel E, by means of a small roller, $f$, which works in the groove of the driving-wheel.

The lever F works on a rock-shaft, G, at its lower extremity, connecting it with the frame, and it is attached at its upper extremity, by a small pin, $g$, to the sliding bar H, by means of which connection it gives a reciprocating motion to the soldering apparatus, working it back and forth, as hereinafter described.

Around the center-piece C, and resting on the top B of the frame A, is placed a revolving circular table, I, with a gear, J, cut on its under surface. Upon its upper surface a number (four or more) of supporting-brackets, K K, are attached to support an equal number of molds, L L, on which the cylinders are formed. These molds L L, preferably made hollow, but may be solid, pass through the supporting-brackets K K, and are connected, by means of a shaft, $l^1$, and roller, $l^2$, with a cam-groove, $Q^1$, so cut in the surface of the center-piece C as to move the molds L L by a cam motion back and forth through the supporting-brackets K K as the circular table I rotates.

Attached on the outer edge of the surface of the revolving table I, so as to fold round each mold L, are a number of pairs of beveled clips, M M. Each pair of these clips M M are hinged by means of small shafts $m^1\ m^1$, resting in a small bracket-piece attached to the surface of the table I, and these shafts $m^1\ m^1$ are operated by means of cranks $m^2$, working in a groove, $Q^2$, so cut in the edge of the center-piece C as to give a cam motion to the shafts $m^1\ m^1$, and cause the clips M M to open and close around the molds as the circular table I rotates.

The shafts $m^1\ m^1$ are made with slots or in other equivalent manner, to key them firmly to the clips M M, and the beveled edges of the clips are cut to receive a piece of slate, $m^3$, or other equivalent material, to prevent the solder sticking to the metal. These clips M M are so attached and worked by their respective shafts $m^1$ and cranks $m^2$ that one of them has slightly the lead of the other in folding around the mold, so that the edges of the sheet of metal shall not meet, but one edge be made to overlap the other.

$N^1$ and $N^2$ are two supports erected on the center-piece C to support the sliding bar H. Their surfaces are on a level, so that the sliding bar would work over them on a horizontal line but for the manner in which the sliding bar H is constructed. This sliding bar H has attached to it on the under side, and at the end nearest to the generator R, a wedge-shaped piece of metal, $h$, to operate as a lift; or the bar H may be made solid, with an extra thickness on the lower side at the end nearest to the gas-generator, to serve as a lift, $h$. This lower wedge-shaped lift, $h$, on the under side of the sliding bar H ought to be of suitable length, extending the distance between the support $N^1$ and the rear end of the gas-generator when the bar has been pushed forward sufficiently far to have the soldering-bolt reach the mold L.

The revolving circular table I, with its under gear, J, is made to rotate by means of the gears $O^1$ $O^2$ $O^3$ $O^4$ $O^5$, working in each other, and connected together by the horizontal shaft $P^1$ and the upright shaft $P^2$. The gear $O^5$, being the one on the upper end of the upright shaft $P^2$, is the one which works on the gear J, causing the table I to rotate; and this gear $O^5$ has a section of the gear cut out, so that at a certain moment it is to be detached from the gear J of the table I, thus causing the table I at that particular moment to cease rotating, and this particular moment is when the soldering apparatus is passing over the seam of the cylinder. The cutting out of this section of the gear $O^5$ gives an intermittent rotary motion to the circular table I.

The soldering apparatus consists of a gas pot or generator, R, Figs. II and III, into which gasoline flows through the tube V, which, after entering the generator, branches off into two branches, one on each side of the solder-bath T, resting in the generator, and through these two branches to two burners, $S^2$ $S^2$, projecting downward, one on each side of the solder-bath T.

The flow of the gasoline to the burners $S^2$ $S^2$ is regulated by the valve-stems $S^1$ $S^1$, the ends $S^3$ $S^3$ of which are fitted into the gas-tube branches, so as either to regulate the flow of the gasoline or stop its flow when desired. S is a smoke-funnel of the gas-generator.

The solder-bath T rests in or upon the gas-generator R, and has a downward-projecting tube, $t^1$, in which the soldering-bolt $t^2$ is fastened by a screw or other suitable fastening. The solder-bath T rests between the branches of the gasoline-tube, and the downward-projecting tube $t^1$ passes downward between the burners $S^2$ to the lower surface of the gas-generator, with an opening in the lower end to receive the soldering-bolt $t^2$, which projects a little below the under surface of the gas-generator.

The soldering-bolt $t^2$ is made of copper or steel, or other suitable material, with a groove or channel, $u$, cut in it, to allow the molten solder to flow down from the bath and discharge upon the overlapped edges or seam to be united with the solder, which is then distributed by the bolt itself and pressed upon the seams.

In the solder-bath is inserted a valve, $t^3$, with a stem, $t^4$, to regulate the flow of the solder from the bath down to the bolt. This valve-stem $t^4$ is operated by means of the lever $t^5$ striking against an upright piece or support, $t^6$, Fig. I, attached to the center-piece C.

The gas pot or generator R is attached to the mechanism of the machine by the sliding bar H, which is attached to the lever F by the pin $g$ between the supports $N^1$ $N^2$, in such manner as to be moved forward and backward, and the lever F is operated by its roller $f$, resting in the cam-cut groove on the back of the driving-wheel E.

When the gas-generator R is drawn backward and away from the mold L, the lift $h$ has been passed backward over the front support, $N^1$, and has raised the sliding bar H, as well as the gas-generator itself, upward from the horizontal line. When the lever F moves the bar H forward to its work until the soldering-bolt $t^2$ has reached the nearest extremity of the mold L, the rear end of the lift $h$ has passed over the front support, $N^1$, causing the sliding bar to fall to the horizontal line over the surface of the two supports $N^1$ $N^2$, which are on a level with each other, and at the same time causing the soldering-bolt $t^2$ to descend upon the overlapped edges of the cylinder in the mold L, and bringing with it as it passes over its work the pressure of the whole weight of the soldering apparatus, gas-generator, bath, &c.

Instead of using molten solder from the solder-bath, the soldering may also be done by conveying to the seams or overlapped edges of the cylinder, while in position in the mold L under the soldering-bolt $t^2$, wire solder cut into suitable lengths for the seam. This may be done by attaching to the table of the frame a hollow box, W, Fig. 1, made in the form of a T upside down, or in other suitable form. The wire, cut into proper lengths, is put into the upright portion, and a slide, W', works in the horizontal portion. When the slide W' is drawn back behind the upright portion, a wire drops down in front of the slide, which is then forced forward far enough to push the wire out upon the seam, where it is caught by the descending soldering-bolt $t^2$, which melts it upon the seam and presses and distributes it.

When the power is applied to the driving-wheel E, the lever F is moved back and forth on its shaft G by the truck or roller $f$, traveling in the cam-cut groove on the back of the driving-wheel E, and, being attached by the pin $g$ to the sliding bar H, gives the reciprocating motion to the soldering apparatus, which in its backward motion is raised and in its forward motion is lowered by the wedge $h$, as already described. At the same time the rotary table I is rotated by the gear J on its under surface being in connection with the gear $O^1$ on the main shaft D by means of the gears $O^2$ $O^3$ $O^4$ $O^5$ and shafts $P^1$ and $P^2$. This rotary motion of the circular table I is made intermittent, as already described, by a section being cut out of the gear $O^5$, and is so regulated as to time that the rotary motion is arrested at the moment when the soldering-bolt $t^2$ is being pressed over the cylinder in the mold L.

The rotary motion of the table I at the same time opens and closes the clips M M by means of the cranks $m^2 m^2$ of the shafts $m^1 m^1$, attached to the clips M M, traveling in the cam-cut groove on the edge of the center-piece. After the cylinder has been joined and soldered, it remains in its mold L until, by the revolution of the table I, it reaches the position opposite to the one at which it was soldered, and there, while the clips M M are opened, as before described, the mold L is drawn back through the supporting-bracket K by means of the roller $l^2$ of the shaft $l^1$, attached to the mold L, traveling in the cam-cut groove on the surface of the center-piece C. The mold L being thus drawn back from within the cylinder, the latter falls, or is removed, at the same moment, and the distance it has moved on the table I has afforded time to cool.

It is to be observed that the reciprocating motion, while the work of soldering is being performed, may be obtained either by giving it to the soldering apparatus, as already described, or by giving it to the molds L, in which latter case the soldering apparatus would be made stationary as to its horizontal movement laterally. In this machine the cylindrical parts of cans are to be soldered, after which they are severally placed upon suitable receptacles on another soldering-machine, where the head of the can is automatically soldered, for which latter machine we have made application for a patent of even date with the present application.

We claim—

1. A soldering-machine consisting of a circular rotary table, I, having a series of molds, L, and clips M M attached to it, revolved by a train of gear-wheels operated from the main shaft around a stationary circular center-piece, C, having a cam-cut groove on its surface and a cam-cut groove on its edge, all in combination with a soldering apparatus consisting of a gas-generator, R, containing a solder-bath, T, supplied with a soldering-bolt, $t^2$, substantially as shown and described.

2. A reciprocating soldering apparatus consisting of a gas-generator, R, containing a solder-bath, T, supplied with a soldering-bolt, $t^2$, connected by a sliding bar, H, to a lever, F, attached to a shaft, G, in combination with a main shaft, D, and driving-wheel E, working by means of gears and shafts, a rotary table, I, having attached to it molds L L, with clips M M, the latter operating on shafts $m^1 m^1$, to serve as hinges moved by cranks $m^2 m^2$ traveling in a cam-cut groove in the edge of center-piece C, substantially as and for the purpose described.

3. A sliding bar, H, formed with an under wedge-shaped piece, $h$, to operate as a lift, attached in such manner as to lift the bar in its backward motion, and to let it descend to the horizontal line in its forward motion, substantially as set forth and described.

4. A mold, L, having shafts $l^1$ and rollers $l^2$, in combination with a pair of beveled clips, M M, to fold around the mold on hinges or shafts $m^1 m^1$, in combination with the center-piece C, having a cam-groove in its periphery, all substantially as set forth and described.

5. Beveled clips M M, with shafts $m^1 m^1$ and cranks $m^2 m^2$, the latter made to travel in a cam-groove in the edge of the center-piece C, to fold and open the clips M M closely around the circular mold L, all substantially as set forth and described.

6. A machine having a main shaft, D, in combination with a series of beveled gears and shafts, as described, rotating the table I, having on it the molds L L and clips M M, around a center-piece, C, supporting a sliding soldering apparatus, the driving-wheel E, connecting-rod F, sliding bolt H, carrying the soldering apparatus having a soldering-bolt, $t^2$, substantially as and for the purpose described.

In witness whereof we have signed our names, at the said city of Sherbrooke, this 18th day of April, 1879.

PETER DILLON.
JOHN CLEARY.

Witnesses:
E. PELLEW FELTON,
H. A. ELKINS.